US006320166B1

United States Patent
Park

(10) Patent No.: US 6,320,166 B1
(45) Date of Patent: Nov. 20, 2001

(54) DOUBLE LAYERED COOKING APPARATUS

(76) Inventor: Jong Do Peter Park, 2484 Sundial Dr., Unit B, Chino Hills, CA (US) 91749

( * ) Notice: Subject to any disclaimer, the term of this patent is extended or adjusted under 35 U.S.C. 154(b) by 0 days.

(21) Appl. No.: 09/649,354

(22) Filed: Aug. 28, 2000

(30) Foreign Application Priority Data

May 9, 2000 (KR) .................................................. 00-13183

(51) Int. Cl.⁷ .................................................. F27D 11/00
(52) U.S. Cl. .......................... 219/439; 219/430; 219/428; 219/440
(58) Field of Search ..................................... 219/430, 436, 219/439, 440, 428, 530, 540; 413/6; 99/330, 403; 126/376.1; 220/619, 689, 573.4

(56) References Cited

U.S. PATENT DOCUMENTS

| | | | | |
|---|---|---|---|---|
| 2,440,128 | * | 4/1948 | Sullivan | 219/440 |
| 2,515,879 | * | 7/1950 | Korn | 219/440 |
| 2,562,843 | * | 7/1951 | Grondahl | 219/439 |
| 3,644,709 | * | 2/1972 | Hojo | 219/439 |
| 3,736,893 | * | 6/1973 | Coppens et al. | 220/619 |
| 3,823,307 | * | 7/1974 | Weiss | 219/439 |
| 4,145,604 | * | 3/1979 | Carlsson | 219/439 |
| 4,629,866 | * | 12/1986 | Proctor | 219/439 |
| 4,667,085 | * | 5/1987 | Remmel et al. | 219/439 |
| 4,672,179 | * | 6/1987 | Onishi et al. | 219/439 |
| 4,705,184 | * | 11/1987 | Tsukamura | 220/619 |
| 5,092,229 | * | 3/1992 | Chen | 99/403 |
| 5,125,393 | * | 6/1992 | Levitin | 126/376.1 |
| 5,143,504 | * | 9/1992 | Braakman | 413/6 |
| 5,228,384 | * | 7/1993 | Kolosowski | 99/403 |
| 5,305,415 | * | 4/1994 | Stevens | 219/440 |
| 5,756,968 | * | 5/1998 | Chung | 219/428 |
| 5,782,165 | * | 7/1998 | Glenboski et al. | 219/439 |
| 6,173,643 | * | 1/2001 | Qian et al. | 99/403 |

* cited by examiner

Primary Examiner—Teresa Walberg
Assistant Examiner—Fadi H. Dahbour
(74) Attorney, Agent, or Firm—Lee & Hong

(57) ABSTRACT

A cooking apparatus in a form of a container includes an outer shell and an inner shell wherein a cavity is provided by coupling the edges of the outer and inner shells. The cavity is partially filled with a heat conductive medium, such as silicon oil. The cooking apparatus further includes an electric heating element installed under the container between the outer and inner shells. When energized, the heating element produces heat which in turn heats the silicon oil. The hot silicon oil heats the inner shell and thus cooks the food in the container. The outer shell of the container also has a pressure controlling member that is opened when a cavity pressure exceeds a predetermined value. The pressure controlling member comprises a spring housing securely affixed to the outer shell and defining a first through hole. The spring housing has a valve biased to open when a cavity pressure exceeds a predetermind value. The pressure controlling member also includes a spring disposed in the first through hole to bias the valve in a closed position and a spring suspension member connected to the spring housing to support the spring to bias the valve in the closed position.

10 Claims, 3 Drawing Sheets

DOUBLE LAYERED COOKING APPARATUS

CROSS REFERENCE TO RELATED ART

This application claims the benefit of Korean Patent Application No. 2000-13183, filed on May 9, 2000, which is hereby incorporated by reference.

This application also incorporates by reference co-pending application Ser. No. 09/449,156 filed on Nov. 24, 1999.

BACKGROUND OF THE INVENTION

1. Field of the Invention

The present invention relates to a cooking apparatus, and particularly, to a cooking apparatus having a double-layered wall structure which enables to heat a heat conductive medium filling a cavity format between the double-layered structure by an electrical heating element.

2. Discussion of the Related Art

Various types of cooking apparatus are known and used in a kitchen. Such cooking apparatus is made of one or more layers of stainless steel and has a single-layered bottom. The single-layered bottom is good for directly transmitting heat to the food contained in the utensil, but also causes burning of the food when carefully not attended to.

Generally, cooking pots are heated by external flames or by electrical heating devices. Such pots of the related art enable to cook food contained inside by heating the bottom surface thereof, thereby causing problems such that the cooking substances tend to scorch and stick to the bottom of the pot due to the direct heating. As a result, the genuine flavor of the cooked food is lost due to the abrupt cooling of the pot after the external heat is removed.

To solve the above problems, a cooking apparatus having a double-layered structure has been proposed for preventing burnt food and to improve food flavor. One of such ideas is published in Korean Utility Laid-Open Publication Nos. 85-7307 and 95-24398 which teaches that paraffin is injected between a space provided by a double-layered structure and an air-hole is established thereon. Moreover, a pot having a double-layered structure into which a working fluid is injected is illustrated in Japanese Laid-Open Publication Nos. 56-169825 and 63-48526.

The pots according to the related art fail to be sealed completely, contaminate the food inside due to the leakage of the heat conductive medium from the falty or leaky sealing of the double wall.

Accordingly, the pots according to the related arts provide poor heat efficiency, have short life-expanse due to poor mechanical strength, and fail to provide effective heat insulation.

SUMMARY OF THE INVENTION

Accordingly, the present invention is directed to a cooking apparatus in the form of a container that substantially obviates one or more of the problems due to limitations and disadvantages of the related art.

An object of the present invention is to provide a double-layered cooking container having a secured sealing between the inner and outer shells.

Another object of the present invention is to provide a double-layered cooking container to improve heat efficiency by indirectly heating the heat conductive medium, thus providing long durability and even-heat distribution to the inner shell.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a cooking apparatus comprises a container having an outer shell and an inner shell, wherein a cavity is provided by coupling and sealing edges of the outer and inner shells. The container comprises an electric heating element installed at a lower portion of the container between the bottom inner and outer shells, wherein the heating element is not in contact with the inner shell; and a heat conductive medium at least partially filling the cavity. The outer shell of the container defines a clamping hole for installing therein a pressure controlling member. The pressure controlling member is opened when a cavity pressure exceeds a predetermined value.

According to one aspect of the present invention, the pressure controlling member comprises a spring housing defining a spring device hole and a pressure controlling hole connected thereto, wherein the spring housing has a screw thread on a circumference thereof and a screw head at one end of the spring housing; a nut coupling the spring housing to the outer shell; a pressure control valve in the spring device hole to block the pressure controlling hole; a spring placed in the spring housing to bias the pressure control valve against the pressure controlling hole; and a spring suspension member having a through-hole and is being threadably coupled with the the spring housing to control the biasing force of the spring, wherein the through hole is in fluid communication with the spring device hole.

According to another aspect of the present invention, the pressure controlling member comprises a spring housing defining a spring device hole and a pressure controlling hole connected thereto, wherein the spring housing has a groove around the outer circumference thereof; a pressure control valve in the spring device hole to block the pressure controlling hole; a spring placed in the spring housing to bias the pressure control valve against the pressure controlling hole; and a spring suspension member having a through hole and is being coupled with the the spring housing with a step ring being placed in the groove of the spring housing.

In the preferred embodiment, the outer and inner shells are rolled together to provide a sealed structure. In addition, the cooking apparatus further includes a container lid covering the container and a heat insulation cover covering over the container. The container lid comprises a dome-shaped disk of tempered glass of which edge is surrounded by a guard ring. The heat insulation cover is preferably made of a stainless steel plate.

According to another embodiment of the present invention, the cooking container comprises an outer shell having an opening; an inner shell disposed inside the outer shell through the opening, forming a cavity between the outer and inner shells, wherein the cavity is formed substantially along the height of the inner shell and at least partially contains a heat conductive medium; a first heat conductive plate being in contact with both an inner bottom surface of the outer shell and an outer bottom surface of the inner shell to allow even distribution of heat through out the bottom surface of the inner shell; a second heat conduction plate affixed to and in contact with an outer bottom surface of the outer shell; a support cover configured to fit in surrounding relation to the second heat conduction plate; and a pressure controlling member coupled with a side of the outer shell. The pressure controlling member is similar to the ones described in connection with the first embodiment of the present invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
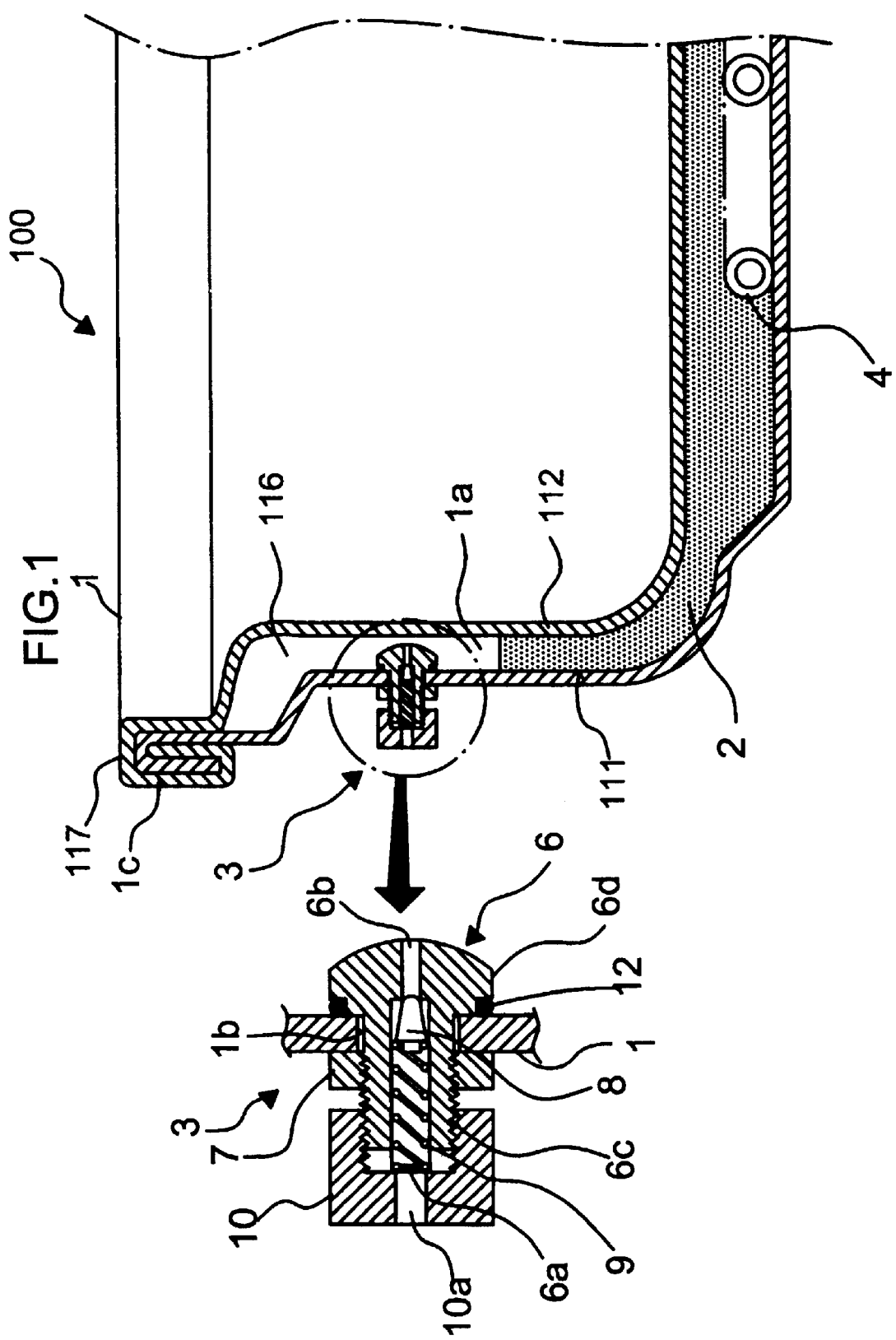
FIG. 1 shows a partial cross-sectional view according to a first embodiment of the cooking apparatus showing a pressure controlling member.
Figure 2:
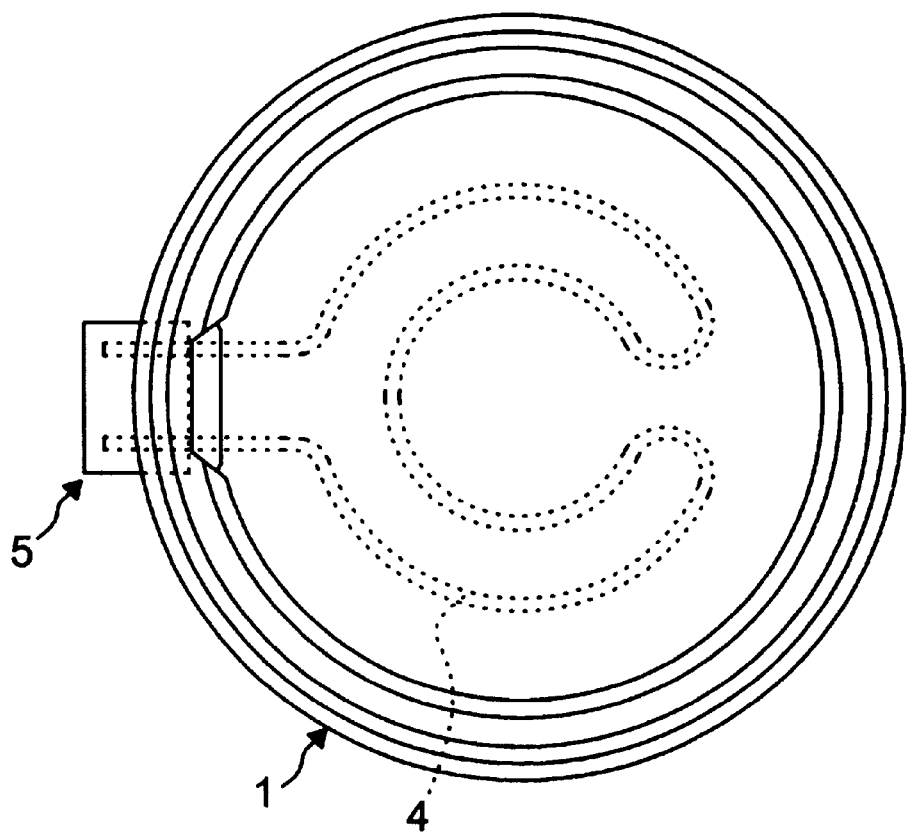
FIG. 2 shows a lay-out of the present invention.

FIG. 1 shows a partial cross-sectional view according to an embodiment of the present invention. FIG. 2 shows a lay-out of the present invention in FIG. 1. The present invention prevents the food from being burnt inside a cooking container as well as from being cooled down abruptly by forming a container 1 to have a double structure providing a cavity 116 having a hollow pocket 1a and a heat conductive medium 2. In the present invention, the heat conductive medium 2 is preferably silicon oil or other suitable medium known to one of ordinary skill in the art. The hollow pocket 1a is preferrably filled with gaseous medium, such as ambient air.

The container 1 of the cooking apparatus 100 according to the present invention includes an outer shell 111 and an inner shell 112 disposed adjacent the outer shell 111. Edges of the outer and inner shells 111 and 112 are preferably rolled together to form a rolled joint 117. As a result, the cavity 116 partially filled with the silicon oil 2 and air 1a is provided between the outer and inner shells 111 and 112. The air pocket 1a and silicon oil 2 are sealed and are not in fluid or gaseous communication with outside unless the pressure controlling member 3 is opened. The cavity 116 is preferably filled with ambient air and silicon oil during the manufacturing process. In the preferred embodiment, the distance between the outer and inner shells 111 and 112 is approximately 15 to 25 mm, and preferably about 20 mm. Preferably, the outer and inner shells 11 and 12 are made of such materials as AISI304 stainless steel that has a thickness of about 0.6 mm. Alternatively, instead of using a single-layered stainless steel, a multiple-layered composite materials may be used. Typically, three or more layered stainless steel or combination of stainless copper and steel are preferred.

In the preferred embodiment of the present invention, both the outer and inner shells 111 and 112 are jointly rolled about 2 to 8 times, and preferably 3 times, to form the rolled joint 117. The tightly rolled joint 117 prevents the air or silicon oil contained in the cavity 116 from escaping through the rolled joint 117 even when the cooking apparatus 100 is subjected to intense heat.

According to the preferred embodiment of the cooking apparatus 100, the pressure controlling member 3 is provided to control the pressure in the cavity 116 formed between the outer and inner shells 111 and 112. In particular, the pressure controlling member 3 releases the excessive pressure generated by the air 1a and silicon oil 2 stored in the cavity 116.

Referring to FIGS. 1 and 2 and in the first embodiment of the present invention, there is provided an electrical heating element 4, such as a resistive heating coil, for providing heat to the container 1. The heating element 4 is preferably placed inside the cavity 116, and more particularly, the silicon oil 2. The heating element 4 has a pair of plugs 5 extending through the submerged in outer shell 111. The plugs 5 are connected to an electrical heat controller to provide electricity to the heating element 4. The heating element 4 is placed either against the upper surface of the outer shell 111 or co-planarly between the outer and inner shells 111 and 112 without touching either one of the shells.

Referring to FIG. 1, the pressure controlling member 3, which is connected to the container 1 through a clamping hole 1b, includes a spring housing 6 which is afixed to the outer shell 111 of the container 1. According to one embodiment of the present invention, the spring housing 6 has a shape of a screw or bolt which is securely afixed to the outer shell 111 using a fastening nut 7. The spring housing 6 defines an elongated spring device hole 6a at one end and a pressure controlling hole 6b at opposite end, thus sharing the same center axis. On the outer circumference the spring housing 6 that defines the spring device hole 6a, there provide are threads 6c for receiving a spring suspension member 10. At the other end of the spring housing 6, a screw head 6d is formed to abut against the inner surface of the outer shell 111. Preferably, a washer or packing 12 may be provided between the screw head 6d and the outer shell 111 to secure the sealing thereof.

Referring to FIG. 1, in the spring device hole 6a, a pressure control valve 8 made of heat-resistant rubber or other suitable material is inserted. The pressure control valve 8 preferably comprises a needle valve. A spring 9 is placed in the rear of the pressure control valve 8 and the spring suspension member 10 is coupled to the spring housing 6.

The spring 9 biases the pressure control valve 8 against the pressure controlling hole 6b to substantially block the same. The spring suspension member 10 has inner threads matching that of the outer threads 6c of the spring housing 6 to fastened thereto. Thus, any excess pressure generated from the cavity 116 is released through the pressure controlling member 3 by elastic movement of the pressure control valve 8. When sufficient pressure is created in the cavity 116, the pressure control valve 8 is pushed back by the perssure and the pressure is relieved through the pressure controlling hole 6b, the spring device hole 6a and the orifice 10a defined by the spring suspension member 10.

In the preferred embodiment, the lengthwise location of the spring suspension member 10 may be rotatably adjusted with respect to the spring housing 6. The location of the spring suspension member 10 adjusts the tension in the spring 9 to control the opening and closing of the pressure control valve 8.

During the manufacturing process of the cooking apparatus 100, the silicon oil 2 may be injected into the cavity 116 before sealing the cavity 116 by rolling the inner and outer shells 112 and 111. Alternatively, the silicon oil 2 may be introduced in the cavity 116 by injecting through the pressure controlling hole 6b. Furthermore, a protection cover to absorb mechanical shock as well as to improve heat insulation may be attached to the bottom of the cooking apparatus 100 for convenience.

Figure 4:
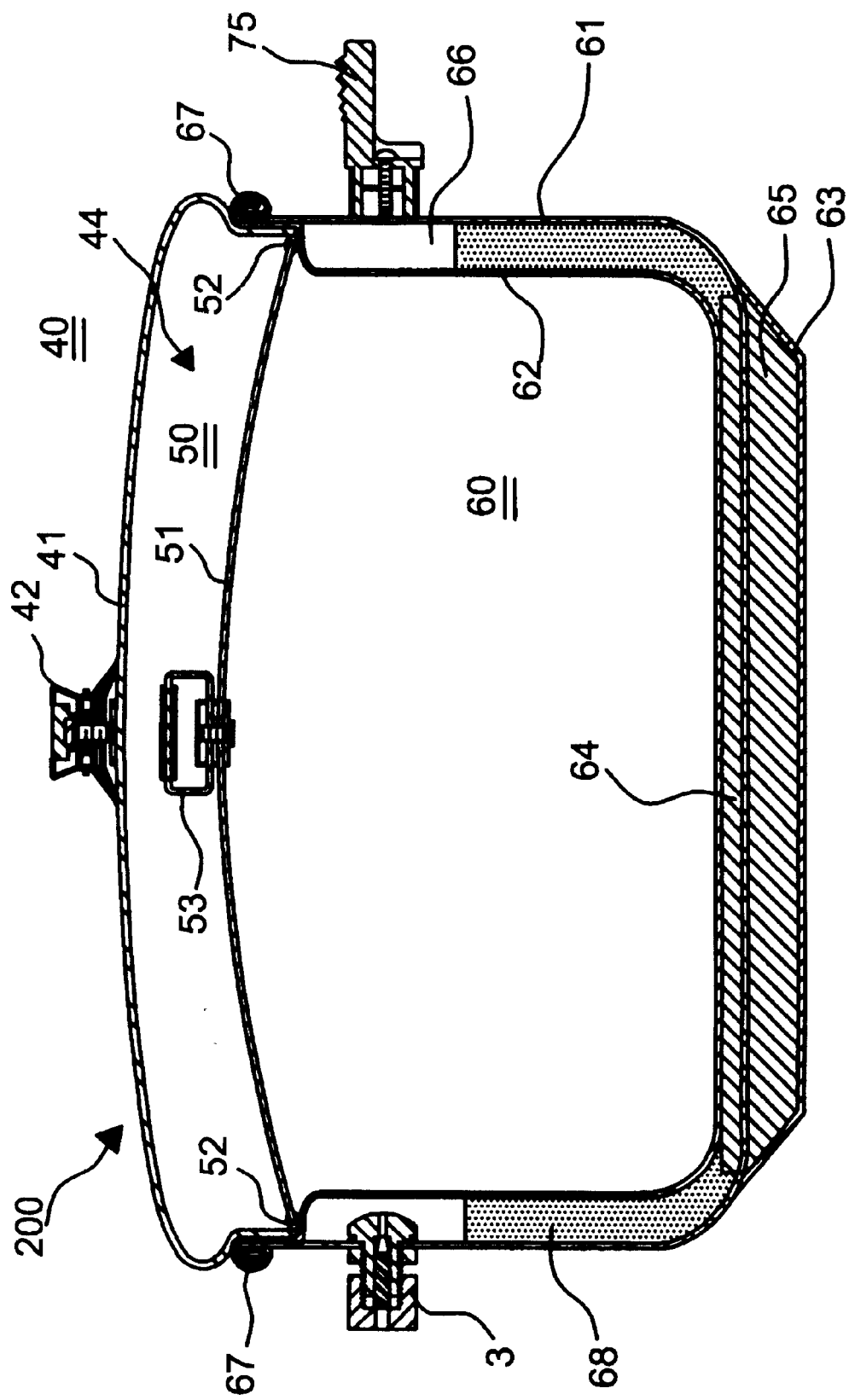
FIG. 4 shows a cross-sectional view of a second embodiment according to the present invention.

The cooking apparatus 100 shown in FIG. 1 may be fitted with a heat insulating cover, such as a dome-shaped glass lid 51 shown in FIG. 4. The lid 51 is preferably made of a tempered glass disk of which the edge is protected by a stainless steel ring. Moreover, the cooking apparatus 100 may have a heat insulation cover, similar to the stainless steel lid 41 shown in FIG. 4.

Figure 3:
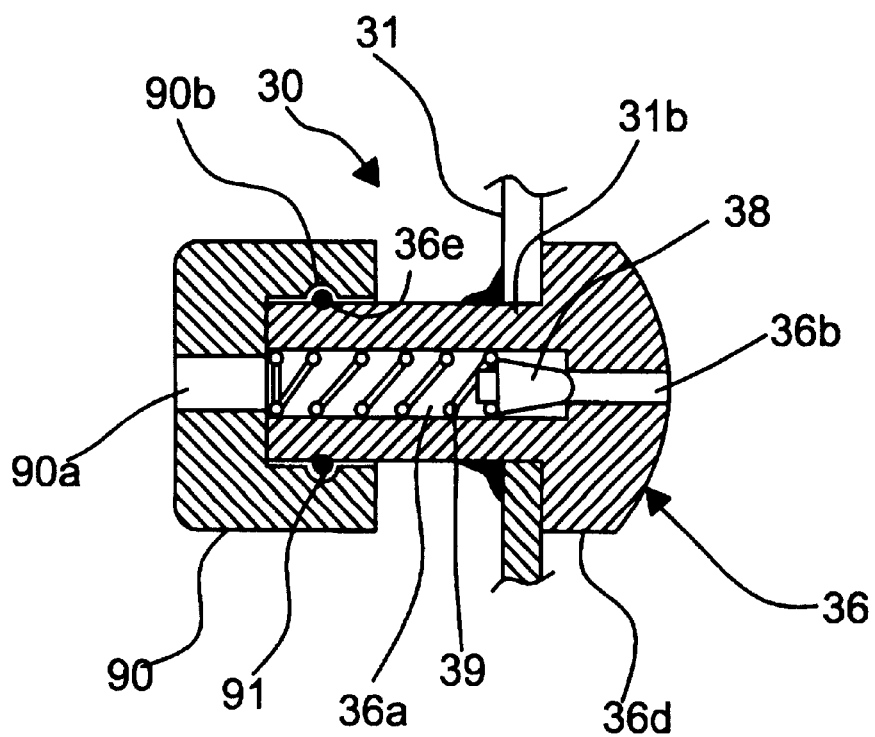
FIG. 3 shows a cross-sectional view of another embodiment of the pressure controlling member according to the present invention.

FIG. 3 shows a cross-sectional view of another embodiment of a pressure controlling member 30 according to the present invention. The pressure generated from the heated silicon oil 2 in the cavity 116 is controlled by elastically suspending a pressure control valve 38. A spring housing 36 having a spring device hole 6a and a pressure controlling hole 6b in a clamping hole 1b of the outer shell 111 is afixed to the outer shell 111 by welding or other suitable process. The pressure controlling member 30 may be used with the container 1 shown in FIG. 1 or that shown in FIG. 4. The welding of the spring housing 36 to the outer shell 111 of the container 1 enhances assembly and productivity.

According to FIG. 3, the spring housing 36 of the pressure controlling member 30 is shaped like screw or a bolt which is securely afixed to the outer shell 111. The spring housing 36 defines an elongated spring device hole 36a at one end and a pressure controlling hole 36b at opposite end, thus preferably sharing the same center axis. On the outer circumference of a portion of the spring housing 36 that defines the spring device hole 36a, there provide is a circumferencial outer groove 36e for receiving therein a step ring 91. At the other end of the spring housing 36, a screw head 36d is formed to be placed against the inner surface of the outer shell 111.

Referring to FIG. 3, in the spring device hole 36a, a pressure control valve 38 made of heat-resistant rubber or other suitable materials is inserted. The pressure control valve 38 preferably comprises a needle valve. A spring 39 is placed in the rear of the pressure control valve 38 and a spring suspension member 90 is coupled to the spring housing 36. In particular, the inner wall of the spring suspension member 90 has a matching inner groove 90b as that of the outer groove 36e. The step ring 91 is positioned between the outer groove 36e and the inner groove 90b to releasably couple the spring suspension member 90 to the spring housing 36. The step ring 91 is made of metal or other suitable materials.

The spring 39 biases the pressure control valve 38 against the pressure controlling hole 36b. Thus, any excessive pressure generated from the cavity 116 is released through the pressure controlling member 30 by elastic movement of the pressure control valve 38. When sufficient pressure is created in the cavity, the pressure is relieved through the pressure controlling hole 36b, the spring device hole 36a and the orifice 90a defined by the spring suspension member 90.

When the heating element 4 of the cooking apparatus 100 shown in FIG. 1 is energized, the heating element 4 generates heat which in turn heats the silicon oil 2 stored in the cavity 116. Due to the placement of the silicon oil 2, the inner shell 112 of the container 1 is evenly heated, thereby providing even heat distribution to the food contained therein. As a result, the scorching of the container 1 and sticking of the food inside the container 1 is substantially minimized. Moreover, the cooking apparatus 100 according to the present invention has excellent heat retension because even if the heating element 4 is no longer energized, the hot silicon oil 2 maintains the food warmer for a longer period of time.

The present invention provides the pressure controlling member 3 or 30 to evenly discharge the increased inner pressure in the cavity 116. As the inner pressure rises, the pressure control valve 8 is pushed outward to release the inner pressure. Further, when the pressure in the cavity 116 returns to a predetermined nominal value, the spring 9 biases the pressure control valve 8 to close the valve. Thus, substantially even pressure is maintained in the cavity 116 of the cooking apparatus 100.

When cleaning is necessary, the double-layered cooking apparatus 100 may be simply washed similar to any other kitchen cooking apparatus. In room temperature, the pressure control valve 8 is biased to block the pressure controlling hole 6b to prevent any silicon oil 2 from escaping therethrough. The plug 5 portion of the heating element 4 extending through the outer shell 111 is also sealed with silicon to prevent silicon oil 2 from escaping therethrough.

FIG. 4 shows a cross-sectional view of a second embodiment of the cooking apparatus 200. According to the second embodiment of the cooking apparatus 200, the inner lid 50 is constructed with a dome-shaped disk 51 of which edge is surrounded by a safety ring 52 preferably made of stainless steel or other suitable materials. The safety ring 52 is attached to the edges of the disk 51, thereby preventing damages to the disk 51. However, the inner lid 50 may be used without the ring 52. Preferably, the disk 51 is made to form a slight convexed surface with respect to the container 60 of the cookware.

The disk 51 of the inner lid 50 is preferrably made of tempered glass of approximately 4 mm thick. Alternatively, the disk 51 may be made of stainless steel, alumunium, aluminum alloy or other suitable materials known to one of ordinary skill in the art.

A handle 53 is attached to the center of the dome-shaped disk 51 by, for example, piercing the central portion of the disk 51. Alternatively, the handle 53 may be affixed to the disk 51 by using adhesives or other fasteners.

The thermal insulating cover 40 is preferably made of a stainless steel plate 41 being about 0.5 to 0.7 mm thick, and preferably about 0.6 mm thick, and has a dome like figure. The insulating cover 40 and the inner lid 50 form a horizontal air cavity 44 which acts as an insulating layer to trap and hold heated air therein. As a result, once the heat source is removed from underneath the cooking apparatus 200, the air cavity 44 and the vertical cavity 66 filled with ambient air insulate the inner shell 62 from outside and reduce heat loss, thus keeping the food contained in the inner shell 62 warmer for a longer period of time. More importantly, the structure of the present invention allows the food to be cooked even after removing heat from the cooking apparatus 200. Alternative to a single sheet structure, the cover 40 may comprise a plurality of layers of stainless steel and/or aluminum for increased durability and preservation of heat. In the thermal insulating cover 40, a knob 42 is attached to the center of the thermal insulating cover 40. In the present invention, the knob 42 may include a built-in temperature gauge for measuring the inside temperture of the cookware. The temperature gauge provides the user to remove the cooking apparatus 200 from the heat source once a desired temperature has been reached.

The container 60 of the cooking apparatus 200 according to the present invention includes an outer shell 61 and an inner shell 62 disposed adjacent the outer shell. Edges of the outer and inner shells 61 and 62 are preferably rolled together to form a rolled joint 67. As a result, a vertical cavity 66 partially filled with air and a heat conductive medium, such as silicon oil 68, is provided between the outer and inner shells 61 and 62. The cavity 66 is sealed and is not in fluid or gaseous communication with outside. The cavity 66 filled with air and silicon oil 68 is preferably filled with ambient air during the manufacturing process. In the preferred embodiment, the distance between the outer and inner shells 61 and 62 is approximately 15 to 25 mm, and preferably about 20 mm. Preferably, the outer and inner shells 61 and 62 are made of such materials as AISI304 stainless steel that has a thickness of about 0.6 mm. Alternatively, instead of using a single-layered stainless steel, a multiple-layered composite materials may be used. Typically, three or more layered stainless steel or combination of stainless copper and steel are preferred.

In the preferred embodiment of the present invention, both the outer and inner shells 61 and 62 are jointly rolled about 2 to 8 times, and preferably about 3 times, to form the rolled joint 67. The tightly rolled joint 67 prevents the air or silicon oil 68 contained in the cavity 66 from escaping even when the cooking apparatus 200 is subjected to intense heat.

Referring to FIG. 4, there is provided a first heat conduction plate 64 placed between the outer and inner shells 61 and 62. The first heat conduction plate 64 is preferably made of an aluminum disk, copper or other suitable materials known to one of ordinary skill in the art. The first heat conduction plate 64 is preferably flushly affixed to the bottom of the outer shell 61. The first heat conduction plate 64 is about 1.5 to 2.5 mm thick, and is preferably about 2 mm thick. To provide speedy transmission of heat to the food contained in the cooking apparatus 200, the first heat conduction plate 64 also abuts against the bottom of the inner shell 62. Due to the presence of the first conduction plate 64, there is no space or cavity 66 between the bottom of the inner shell 62 and that of the outer shell 61.

In the preferred embodiment, a second heat conduction plate 65 is disposed below the bottom surface of the outer shell 61 preferably below the first heat conduction plate 64. Similar to the first heat conduction plate 64, the second heat conduction plate 65 is preferably made of an aluminum disk or other suitable materials known to one of ordinary skill in the art. The second heat conduction plate 65 is about 2 to 4 mm thick, and preferably about 3 mm thick. The second heat conduction plate 65 is securely affixed to the bottom of the outer shell 61 by brazing or other suitable method known to one of ordinary skill in the art.

The second heat conduction plate 65 is covered with a support cover 63. The support cover 63 is attached to an outer bottom surface of the outer shell 1 fully surrounding and in contact with the second heat conduction plate 65. The support cover 63 is preferably made of the same material as that of the container 60 of the cooking apparatus 200. In particular, the support cover 63 is made of AISI304 stainless steel that has a thickness of about 0.5 mm. In the container 60, the first heat conduction plate 64, the bottom wall of the outer shell 61, the second heat conduction plate 65 and the support cover 63 are in thermal communication with each other.

In the cooking apparatus 200, the cavity 66 is partially filled with silicon oil 68 up to about 40 to 70% by volume.

Preferably, the silicon oil is filled up to about 55% of the cavity 66 to accommodate for increased pressure. For example, while cooking, the pressure in the cavity 66 varies from 200 mmAG to 600 mmAG due to expansion of the silicon oil 68.

According to FIG. 4, the container 60 has a pair of knobs 75 attached to opposite ends of the outer shell 61. A pressure controlling member 3 is installed near the upper portion of the outer shell 61. The construction and explanation of the pressure controlling member 3 have been provided above with respect to FIGS. 1 and 3 and therefore will not be repeated here. Moreover, the pressure controlling member 30 shown in FIG. 3 may be used with the container 60.

The heat conducting medium or silicon oil 68 may be injected into the cavity 66 before the the outer and inner shells 61 and 62 are sealed at the joint 67. Alternatively, silicon oil may be introduced into the cavity 66 through the pressure controlling hole of the pressure control valve 3 after the container 60 has been manufactured.

Once the bottom of the cooking apparatus 200 is in contact with a heat source, the content contained in the inner shell 62 is heated by the heat transmitted through the support cover 63, second heat conduction plate 65, outer shell 61, first heat conduction plate 64 and finally the inner shell 12, successively.

Because the heat source generally provides for uneven heat distribution to the bottom surface, the bottom of the cooking apparatus 200 is unevenly heated. However, due to the presensence of the support cover 63, second heat conduction plate 65 and first heat conduction plate 64, the heat from the heat source is more evenly distributed to the bottom of the inner shell 62 allowing even distribution of heat to the food contained therein.

The first and second conduction plates 64 and 65 also serve to heat the vertical cylindrical walls of the cooking container 60. Although the most of the heat transmitted to the bottom of the outer shell 61 is conducted to the first heat conduction plate 64, the rest of the heat from the first and second conduction plates 64 and 65 are transferred to the side walls of the outer and inner shells 61 and 62, respectively. Then, the temperature of the air in the space 66 is gradually increased and the heat energy of the air is transmitted to the inner shell 62 and spread out throughout the entire wall of the inner shell 62. Therefore, the temperature along the inner shell 62 is substantially constant at any region thereof. In other words, the temperature of the bottom of the inner shell 62 is about the same as that of the cylindrical wall.

The presence of silicon oil 68 and air in the cavity 66 delays heat transfer between the sides of the outer and inner shells 61 and 62 as well as provides even heat distribution as the heat conducted through the outer shell 61 of the cooking apparatus 200 primarily is not transferred to the inner shell 62 of the pot but is partially conveyed through the air.

The heat distributed uniformly in the inner shell 62 heats up the content in the cooking apparatus 200. Once heated, the double-layered structure of the cooking apparatus 200 according to the present invention traps the heat, even after the heat source is removed, for a prolonged period. The heat loss through the sidewalls of the inner and outer shells 61 and 62 are slowed due to the presence of the cavity 66.

The present invention provides the pressure controlling member 3 or 30 to evenly discharge the increased inner pressure in the cavity 66. As the inner pressure rises, the pressure control valve 8 is pushed outward to release the inner pressure. Further, when the pressure in the cavity 66 returns to a predetermined nominal value, the spring 9 biases the pressure control valve 8 to close the valve. Thus, substantially even pressure is maintained in the cavity 66 of the cooking apparatus 200.

As an alternative embodiment of the present inventio, the second conduction plate may have a built-in heating element embeddd in the aluminum disk. As a result, in lieu of using externally applied heat, the heating element, similar to one shown in FIG. 1, can produce heat for purpose of heating the first and second conduction plates 64 and 65.

It will be apparent to those skilled in the art that various modifications and variations can be made in the present invention without departing from the spirit or scope of the inventions. Thus, it is intended that the present invention cover the modifications and variations of this invention provided they come within the scope of the appended claims and equivalents.

What is claimed is:

1. A cooking apparatus comprising a container having an outer shell and an inner shell wherein a cavity is formed by coupling and sealing edges of the outer and inner shells, the container comprising:
   an electric heating element installed at a lower portion of the container between the bottom inner and outer shells, wherein the heating element is not in contact with the inner shell; and
   a heat conductive medium at least partially filling the cavity, wherein the outer shell of the container defines a clamping hole for installing therein a pressure controlling member, the pressure controlling member being opened when a cavity pressure exceeds a predetermined value, the pressure controlling member further comprising:
      a spring housing defining a spring device hole and a pressure controlling hole connected thereto, wherein the spring housing has a groove around the outer circumference thereof;
      a pressure control valve in the spring device hole to block the pressure controlling hole;
      a spring placed in the spring housing to bias the pressure control valve against the pressure controlling hole; and
      a spring suspension member having a through hole and is being coupled with the spring housing with a step ring being placed in the groove of the spring housing.

2. The cooking apparatus according to claim 1, wherein the outer and inner shells are rolled together at respective rims to provide a sealed structure.

3. The cooking apparatus according to claim 1 further comprising:
   a container lid covering the container; and
   a heat insulation cover covering over the container.

4. The cooking apparatus according to claim 3, wherein the container lid comprises a dome-shaped disk of tempered glass of which edge is surrounded by a guard ring and wherein the heat insulation cover is made of stainless steel.

5. A cooking apparatus comprising:
   an outer shell having an opening;
   an inner shell disposed inside the outer shell through the opening, forming a cavity between the outer and inner shells, wherein the cavity partially contains a heat conductive medium, the outer and inner shells are joined near the opening to form a container; and
   a pressure controlling member installed in the outer shell, the pressure controlling member comprising:
      a spring housing securely affixed to the outer shell and defining a first through hole, the spring housing having a valve biased to open when a cavity pressure exceeds a predetermind value;
      a spring disposed in the first through hole to bias the valve in a closed position; and
      a spring suspension member connected to the spring housing to support the spring to bias the valve in the closed position, wherein the spring housing has a groove around the outer circumference thereof and the spring suspension member is coupled with the spring housing with a step ring being placed in the groove of the spring housing.

6. The cooking apparatus according to claim 5, further comprising a heat conductive medium at least partially filling the cavity.

7. The cooking apparatus according to claim 6, wherein the heat conductive medium is silicon oil.

8. The cooking apparatus according to claim 5, further comprising an electric heating element installed at a lower portion of the container between the bottom inner and outer shells, wherein the heating element is not in contact with the inner shell.

9. A cooking apparatus comprising:
   an outer shell having an opening;
   an inner shell disposed inside the outer shell through the opening, forming a cavity between the outer and inner shells; and
   a pressure controlling member installed in the outer shell, the pressure controlling member comprising:
      a spring housing securely affixed to the outer shell and defining a first through hole, the spring housing having a valve biased to open when a cavity pressure exceeds a predetermind value;
      a spring disposed in the first through hole to bias the valve in a closed position; and
      a spring suspension member connected to the spring housing to support the spring to bias the valve in the closed position, wherein the spring housing has a groove around the outer circumference thereof and the spring suspension member is coupled with the spring housing with a step ring being placed in the groove of the spring housing.

10. The cooking apparatus according to claim 9, further comprising an electric heating element installed at a lower portion of the container between the bottom inner and outer shells, wherein the heating element is not in contact with the inner shell.

* * * * *